US012513445B2

(12) United States Patent
Mizushina et al.

(10) Patent No.: US 12,513,445 B2
(45) Date of Patent: Dec. 30, 2025

(54) SPEAKER DEVICE AND HOOD-TYPE SPEAKER DEVICE

(71) Applicant: CASIO COMPUTER CO., LTD., Tokyo (JP)

(72) Inventors: Takahiro Mizushina, Kawagoe (JP); Masanori Ohta, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 226 days.

(21) Appl. No.: 18/269,693

(22) PCT Filed: Nov. 22, 2021

(86) PCT No.: PCT/JP2021/042817
§ 371 (c)(1),
(2) Date: Jun. 26, 2023

(87) PCT Pub. No.: WO2022/145149
PCT Pub. Date: Jul. 7, 2022

(65) Prior Publication Data

US 2024/0073574 A1 Feb. 29, 2024

(30) Foreign Application Priority Data

Dec. 28, 2020 (JP) ................................ 2020-218123

(51) Int. Cl.
*H04R 1/10* (2006.01)
*H04R 1/02* (2006.01)

(52) U.S. Cl.
CPC ............ *H04R 1/1008* (2013.01); *H04R 1/02* (2013.01)

(58) Field of Classification Search
CPC ...... H04R 1/1008; H04R 1/02; H04R 1/1066; H04R 1/1075; H04R 5/0335
See application file for complete search history.

(56) References Cited

U.S. PATENT DOCUMENTS 9,344,794 B1 * 5/2016 Blonder ............... H04R 1/1066
9,864,200 B2 * 1/2018 Chen .................. G02B 27/0176
2004/0216946 A1 * 11/2004 Lenhard-Backhaus ...................... H04R 1/1066 181/129
2005/0244027 A1 * 11/2005 Kaulfuss ............. H04R 5/0335 381/378

(Continued)

FOREIGN PATENT DOCUMENTS

JP S63169790 U 11/1988
JP H04216299 A 8/1992

(Continued)

OTHER PUBLICATIONS

International Search Report dated Dec. 28, 2021 issued in PCT/JP2021/042817.

(Continued)

*Primary Examiner* — Oyesola C Ojo
(74) *Attorney, Agent, or Firm* — Scully, Scott, Murphy & Presser, P.C.

(57) ABSTRACT

A speaker device includes a frame, a left speaker and a right speaker that are coupled to the frame and are configured to be held at predetermined intervals, and a mounting portion that is coupled to left and right positions of the frame and is configured to be suspended by a head.

15 Claims, 16 Drawing Sheets

(56) References Cited

U.S. PATENT DOCUMENTS

| | | | | |
|---|---|---|---|---|
| 2011/0002478 | A1* | 1/2011 | Pollard | H04R 5/033 381/74 |
| 2011/0129111 | A1* | 6/2011 | Santiago | H04R 5/0335 16/248 |
| 2012/0140973 | A1* | 6/2012 | Olodort | H04R 1/1066 381/375 |
| 2012/0140974 | A1* | 6/2012 | Danielson | H04R 1/1066 381/379 |
| 2013/0021311 | A1* | 1/2013 | Watanabe | G02B 27/0176 345/211 |
| 2013/0156248 | A1 | 6/2013 | Nakajima | |
| 2013/0177195 | A1* | 7/2013 | Sze | H04R 1/1008 381/384 |
| 2014/0341415 | A1* | 11/2014 | Camello | H04R 1/323 381/379 |
| 2015/0139473 | A1* | 5/2015 | Jaynes | H04R 1/10 381/379 |
| 2016/0193085 | A1* | 7/2016 | Jenkins | H04R 1/1083 181/129 |
| 2017/0131555 | A1* | 5/2017 | Drinkwater | G02B 27/0176 |
| 2018/0139524 | A1* | 5/2018 | Pi | H04R 1/105 |
| 2021/0195313 | A1* | 6/2021 | Enquist | H04R 5/0335 |
| 2021/0306736 | A1* | 9/2021 | Stefansen | H04R 1/1066 |
| 2022/0086548 | A1* | 3/2022 | Bloom | H04R 1/105 |

FOREIGN PATENT DOCUMENTS

| | | | | | |
|---|---|---|---|---|---|
| JP | 2000295685 | A | | 10/2000 | |
| JP | 2002101488 | A | | 4/2002 | |
| JP | 2007243631 | A | * | 9/2007 | H04N 5/64 |
| JP | 2012-049606 | A | | 3/2012 | |
| KR | 20030091177 | A | | 12/2003 | |

OTHER PUBLICATIONS

Notice of Reasons for Refusal dated Nov. 26, 2024 for Japanese Patent Application No. 2020-218123.

* cited by examiner

SPEAKER DEVICE AND HOOD-TYPE SPEAKER DEVICE

TECHNICAL FIELD

The present invention relates to a speaker device and a hood-type speaker device.

BACKGROUND ART

In related art, wearable speakers such as a head-mounted speaker and an ear speaker in which sound emitting portions can be placed in the vicinity of left and right ears have been proposed. For example, PTL 1 discloses an ear speaker which includes a speaker and a mounting portion for mounting the speaker at a position a predetermined distance away from a user's ear hole, and in which the speaker is movably attached to the mounting portion so that the speaker is directed to the user's ear hole when the ear speaker is worn by the user. Since the ear speaker can prevent the headphone deafness and does not block the ears of the user, the ear speaker allows the user to safely enjoy audio reproduction in a state where the user can hear ambient sound.

CITATION LIST

Patent Literature

PTL 1: JP2012-49606A

SUMMARY OF INVENTION

Technical Problem

However, in the ear speaker of PTL 1, in order to mount the speaker at a position separated by a predetermined distance, the speaker is supported by sandwiching temporal regions of a head. Therefore, depending on a weight and shape of the speaker, it is difficult to stably support the speaker.

In view of the above, an object of the present invention is to provide a speaker device and a hood-type speaker device that can be stably supported with no feeling of oppression.

Solution to Problem

A speaker device according to present invention includes: a frame; a left speaker and a right speaker that are coupled to the frame and can be held at predetermined intervals; and a mounting portion that is coupled to left and right positions of the frame and is configured to be suspended by a head portion.

A hood-type speaker device according to the present invention includes the above-described speaker device and a hood built in the speaker device.

Advantageous Effects of Invention

According to the present invention, it is possible to provide a speaker device and a hood-type speaker device that can be stably supported with no feeling of oppression.

DESCRIPTION OF EMBODIMENTS

Figure 1:
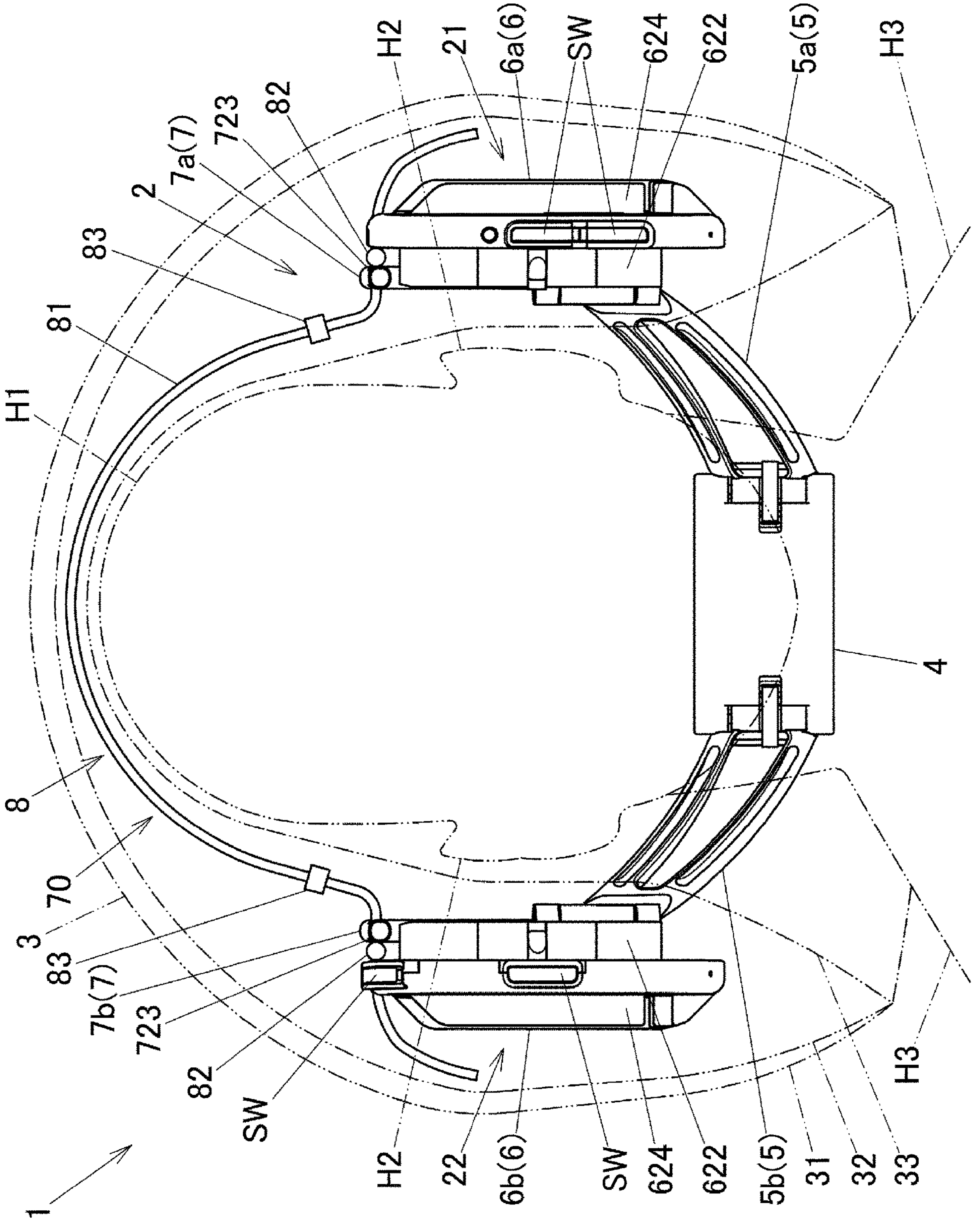
FIG. 1 is a front view showing a state in which a user wears a hood-type speaker device according to an embodiment of the present invention.
Figure 2:
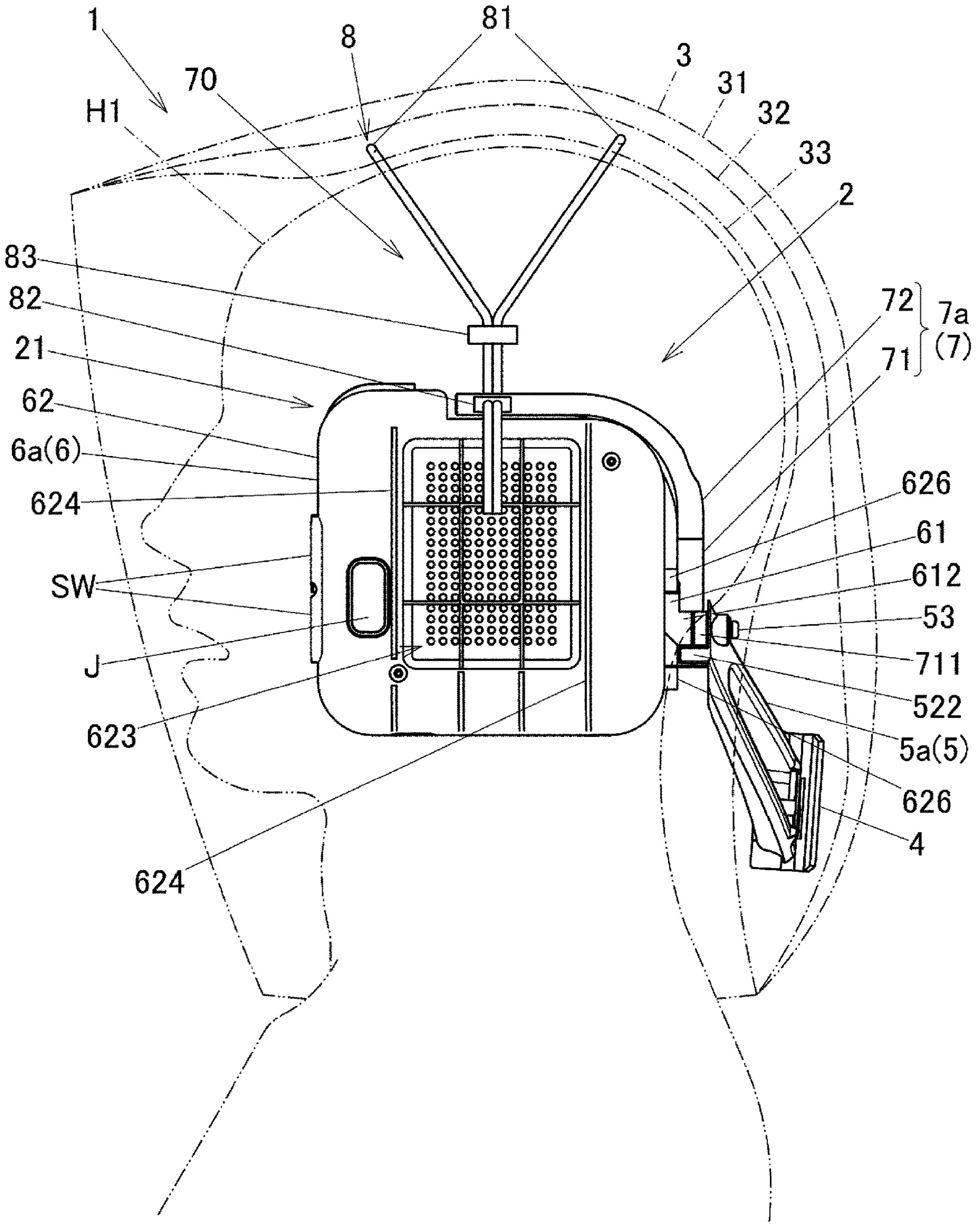
FIG. 2 is a side view showing the state in which the user wears the hood-type speaker device according to the embodiment of the present invention.

Hereinafter, an embodiment for implementing the present invention will be described. A hood-type speaker device 1 shown in FIGS. 1 and 2 includes a speaker device 2 built in a hood 3. The hood-type speaker device 1 can be used by being mounted on a head H1 so as to cover the head H1 with the hood 3. The hood 3 according to the present embodiment has a cloth having a three-layer structure of a front fabric 31, a middle lining fabric 32, and a lining fabric 33. FIGS. 1 and 2 schematically show positions of the front fabric 31, the middle lining fabric 32, and the lining fabric 33 of the hood 3. The hood 3 may be provided integrally with or detachably from a garment such as a coat, or may be individually formed.

The speaker device 2 is disposed between the middle lining fabric 32 and the lining fabric 33 (see also FIG. 2). The speaker device 2 is mainly fixed to the middle lining fabric 32. The entire lining fabric 33 or a peripheral portion where a speaker 6 is disposed is formed in, for example, a net shape or having an opening, so that a sound can be easily transmitted. A sound absorbing material is freely disposed between the front fabric 31 and the middle lining fabric 32, so that a sound leakage to the outside of the hood 3 can be reduced. Further, the hood-type speaker device 1 can be mounted such that a left speaker 6*a* and a right speaker 6*b* are in a state of being separated from left and right ears H2. Accordingly, the user can listen to sounds emitted from the left speaker 6*a* and the right speaker 6*b* with stable acoustic characteristics with no feeling of oppression to the ears H2.

In the following description of the hood-type speaker device 1 (including the speaker device 2), a front side viewed from the user of FIG. 1 on which the hood-type speaker device 1 is mounted is referred to as a front side, an opposite side thereof is referred to as a rear side, an upper side viewed from the user of FIG. 1 is referred to as an upper side, and an opposite side thereof is referred to as a lower side. In the hood-type speaker device 1, a left side viewed from the user in FIG. 1 is a left side, and an opposite side thereof is a right side.

Figure 3:
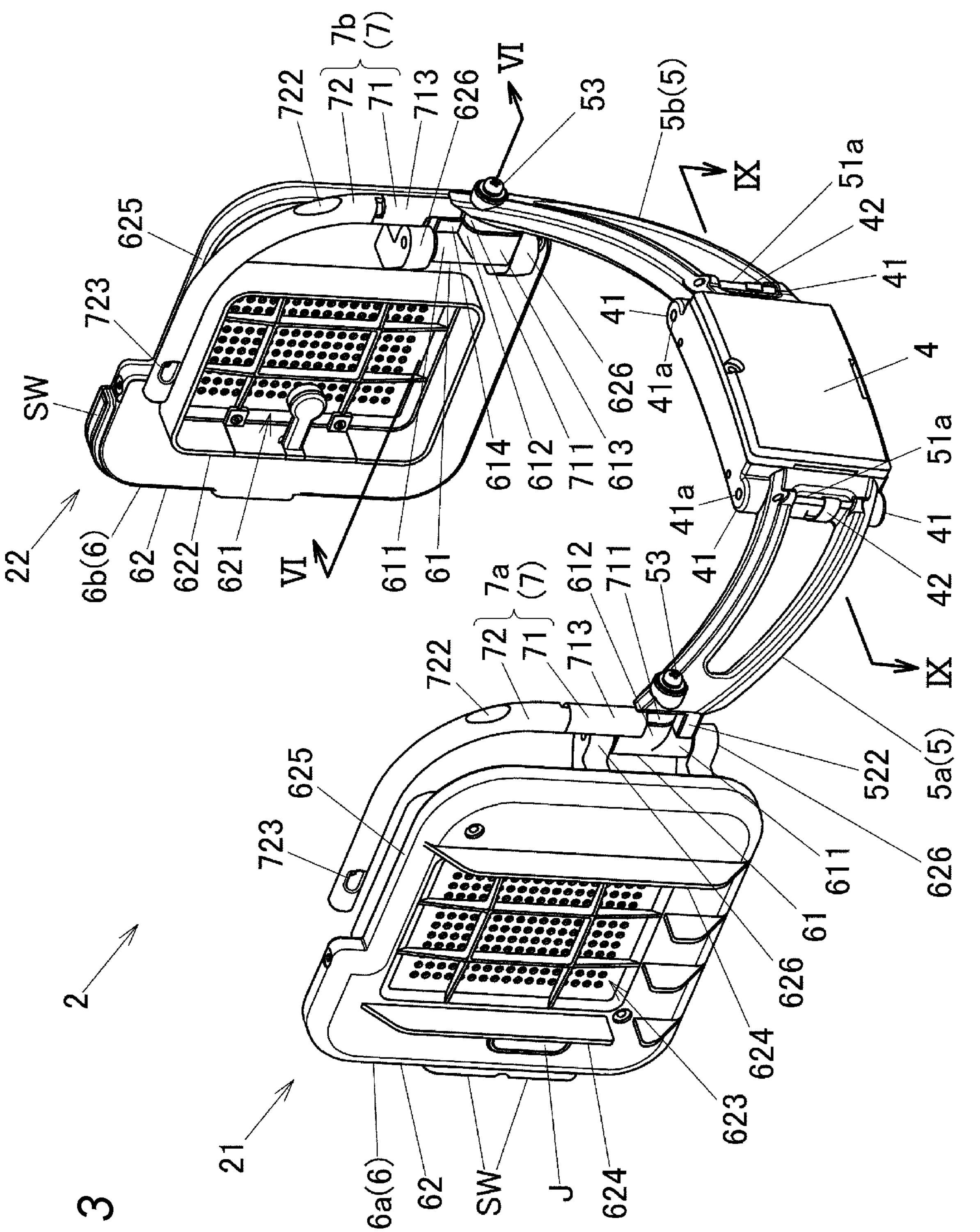
FIG. 3 is a perspective view of a speaker device according to the embodiment of the present invention viewed from a rear side.

Next, the speaker device 2 will be described in detail. FIG. 3 is a perspective view of the speaker device 2 as viewed from the rear side. The speaker device 2 is formed in a U-shape as a whole. The speaker device 2 includes an elongated rectangular main body portion 4 having a thick plate shape, left and right frames 5 (left frame 5*a* and right frame 5*b*) rotatably connected to the main body portion 4, the left and right speakers 6 (left speaker 6*a* and right speaker 6*b*) rotatably connected to the left and right frames 5, and left and right support portions 7 (left support portion 7*a* and right support portion 7*b*) rotatably connected to the left and right frames 5. The frame 5 includes the left frame 5*a* connected to the left speaker 6*a* and the left support portion 7*a*, and the right frame 5*b* connected to the right speaker 6*b* and the right support portion 7*b*. The left frame 5*a* and the right frame 5*b* are formed to be openable and closable via hinge portions 41 (see also FIGS. 9A, 9B, and 10). The speaker 6 and the support portion 7 are connected to the frame 5 so as to be rotatable around two axes (roll axis (first axis P1 and third axis P3) and yaw axis (second axis P2 and fourth axis P4) to be described later).

Next, a configuration of the speaker device 2 on a right arm portion 22 (including the right frame 5*b*, the right speaker 6*b*, and the right support portion 7*b*) side will be described with reference to FIGS. 4A to 8. The left frame 5*a* and the left support portion 7*a* of a left arm portion 21 are bilaterally symmetrical with respect to the right frame 5*b* and the right support portion 7*b* of the right arm portion 22, respectively, and have the same function. Incidentally, although an outer shape of the left speaker 6*a* is substantially bilaterally symmetrical with respect to the right speaker 6*b*, a configuration of a push button SW, presence or absence of a jack J, and the like may be different. The configurations of the left arm portion 21 similar to those on a right arm portion 22 side are denoted by the same reference numerals, and descriptions thereof are omitted or simplified.

The main body portion 4 includes a battery, a control circuit, and the like therein. On both left and right sides of the main body portion 4, shaft core members 41*a* of which shaft lines are disposed in an upper-lower direction are provided. The shaft core members 41*a* are inserted into shaft holes of bearing portions 51, so that the frame 5 is rotatably connected to the main body portion 4 around the shaft core members 41*a* (also see FIG. 9A). The main body portion 4 includes a cylindrical rod-shaped engaged portion 41*b* disposed in the upper-lower direction on an inside of the main body portion 4 (on the inside of the speaker device 2) with respect to the shaft core member 41*a* (see FIGS. 4A and 9A). Further, the frame 5 includes a cylindrical rod-shaped engaged portion 51*a* disposed in the upper-lower direction outside the shaft core member 41*a* (see FIGS. 5A and 9A). An outer diameter of the bearing portion 51 of the frame 5 is formed in a cylindrical shape, and a groove portion 511 extending in a circumferential direction is provided on an outer surface on a front side thereof.

Figure 4A:
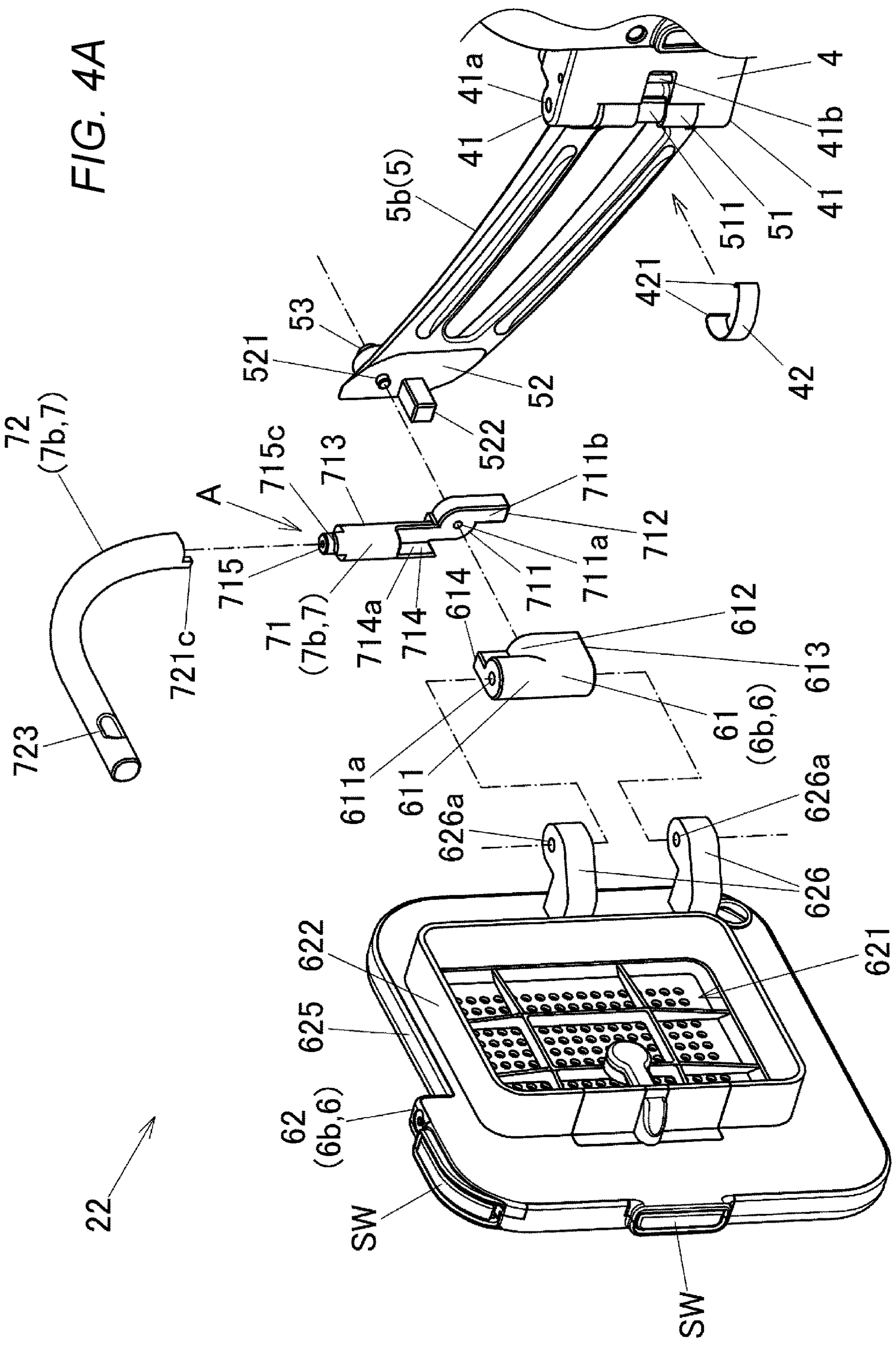
FIG. 4A is an exploded perspective view of a right arm portion of the speaker device according to the embodiment of the present invention as viewed from an upper front side.
Figure 9A:
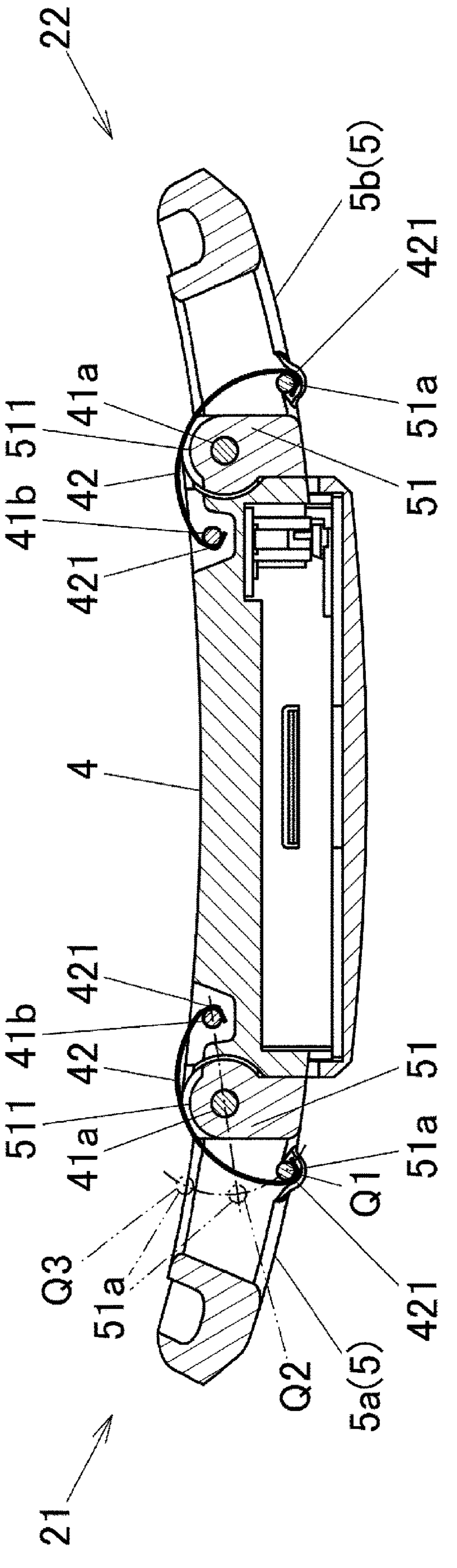
FIG. 9A is a cross-sectional view of a periphery of a main body portion of the speaker device according to the embodiment of the present invention taken along a line IX-IX shown in FIG. 3, and shows a state in which a left arm portion and the right arm portion of the speaker device are opened.
Figure 9B:
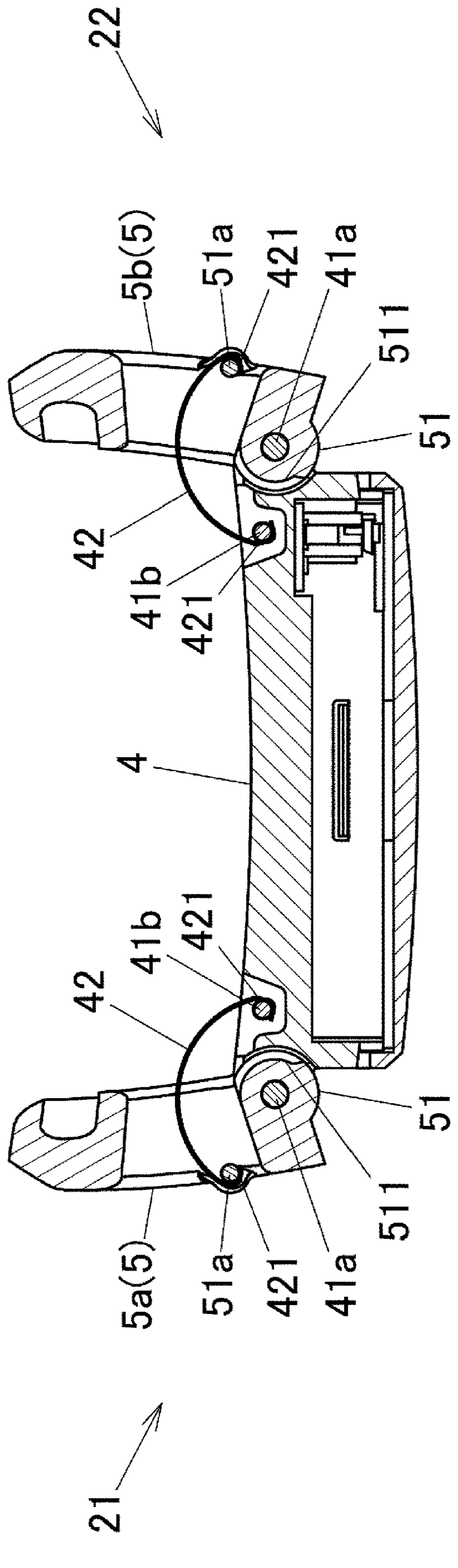
FIG. 9B is a cross-sectional view of the periphery of the main body portion of the speaker device according to the embodiment of the present invention taken along the line IX-IX shown in FIG. 3, and shows a state in which the left arm portion and the right arm portion of the speaker device are closed.

An elastic member 42 in a plate spring form that is curved in a U-shape is attached to the hinge portion 41 and the bearing portion 51 (see FIGS. 4A and 9A). On both end portions of the elastic member 42, engaging portions 421 further curved in directions facing each other are provided. The elastic member 42 is attached in a pulled state by respectively engaging the engaging portions 421 with the engaged portion 41*b* and the engaged portion 51*a*. When the frame 5 is in an open state, a center side of the elastic member 42 is disposed in the groove portion 511 (see FIG. 9A), and interference with the bearing portion 51 is avoided.

In the open state, the left frame 5*a* and the right frame 5*b* are formed to be long so as to expand obliquely upward from the main body portion 4 toward a front outside (also see FIGS. 1 and 2). As shown in FIG. 4A, an inside of the frame 5 is opened in a front-rear direction along a longitudinal direction. A flat sliding contact surface 52 is provided on an end portion of the frame 5 on a side opposite from the main body portion 4. The sliding contact surface 52 has an opening portion 521 which is opened in a substantially front-rear direction in FIG. 4A, and is provided with a quadrangular prism shaped restricting protrusion 522 which protrudes in a normal direction from the sliding contact surface 52 below the opening portion 521.

The support portion 7 includes a base portion side rotary member 71 rotatably connected to the frame 5 within a predetermined angle range, and a tip end side member 72 rotatably connected to the base portion side rotary member 71 within a predetermined angle range. The support portion 7 is formed in an L shape from a rear side of the speaker 6 (the left speaker 6*a* and the right speaker 6*b*) to the upper side. The base portion side rotary member 71 includes a supported portion 711 having an opening portion 711*a* supported by a screw member 53 on a center side. The supported portion 711 has flat sliding contact surfaces 711*b* and 711*c* (also see FIG. 5A) with an axis of the opening portion 711*a* oriented in the front-rear direction. The supported portion 711 includes a quadrangular prism shaped restricted portion 712 extending in one direction orthogonal to the axis of the opening portion 711*a*. Further, the supported portion 711 includes a cylindrical extending portion 713 extending in the other direction orthogonal to the axis of the opening portion 711*a* and on a side opposite from the restricted portion 712. The extending portion 713 and the restricted portion 712 are disposed on opposite sides from the supported portion 711 in a substantially parallel direction.

The extending portion 713 on a supported portion 711 side is cut out, so that a cross section perpendicular to a length direction is L-shaped, and is provided with a restricting portion 714 that is configured to restrict a base portion side rotary member 61 of the speaker 6 within a predetermined rotating range. An abutting surface 714*a* inside the restricting portion 714 and the sliding contact surface 711*b* are disposed at a substantially right angle. In a state of FIG. 4A in which the restricted portion 712 is disposed on the lower side and the extending portion 713 is disposed on the upper side, the abutting surface 714*a* is disposed toward an inside of the speaker device 2 and is disposed on an outer side (right side in the case of the right support portion 7*b*) with respect to the opening portion 711*a*.

Figure 4B:
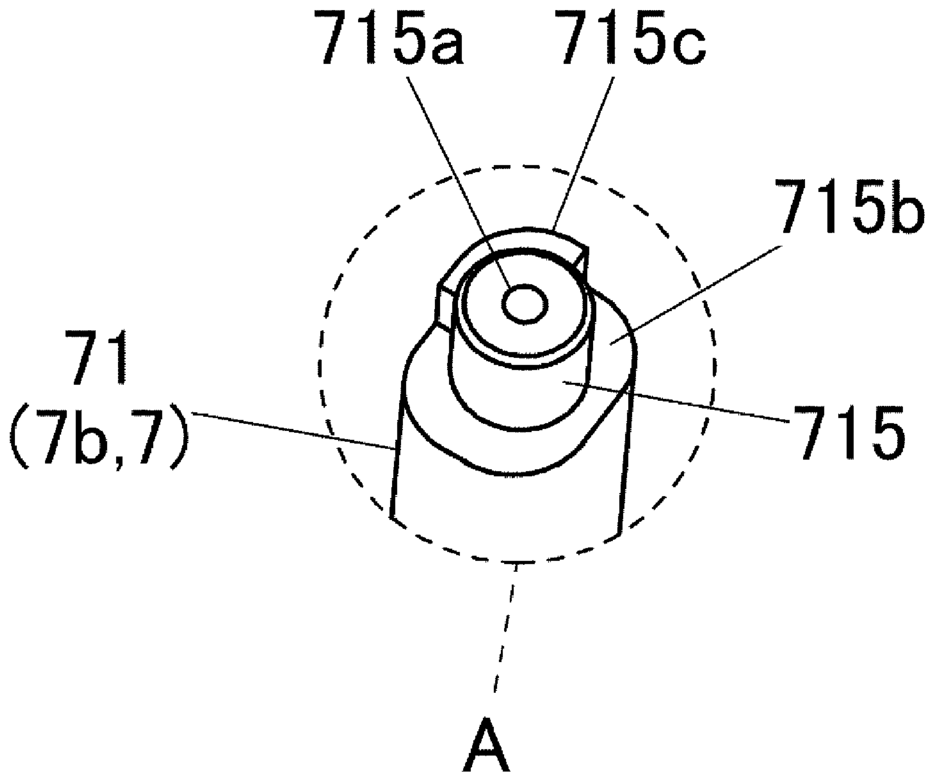
FIG. 4B is an enlarged view of a portion A shown in FIG. 4A.

As shown in FIG. 4B, a cylindrical shaft portion 715, which has a smaller diameter than an outer shape of the extending portion 713 and is substantially coaxial with the extending portion 713, protrudes from a tip end portion of the extending portion 713. A female screw portion 715*a* is formed substantially at a center of the shaft portion 715 on a tip end side. The extending portion 713 includes, around the shaft portion 715, an outer peripheral portion 715*b* that is a C-shaped flat surface and a rotation restricting portion 715*c* that protrudes from the outer peripheral portion 715*b* in a direction of the shaft portion 715. The outer peripheral portion 715*b* is provided in an angle range of 270 degrees around the shaft portion 715, and the rotation restricting portion 715*c* is provided in an angle range of 90 degrees. A height of the rotation restricting portion 715*c* is lower than that of the shaft portion 715.

Figure 5A:
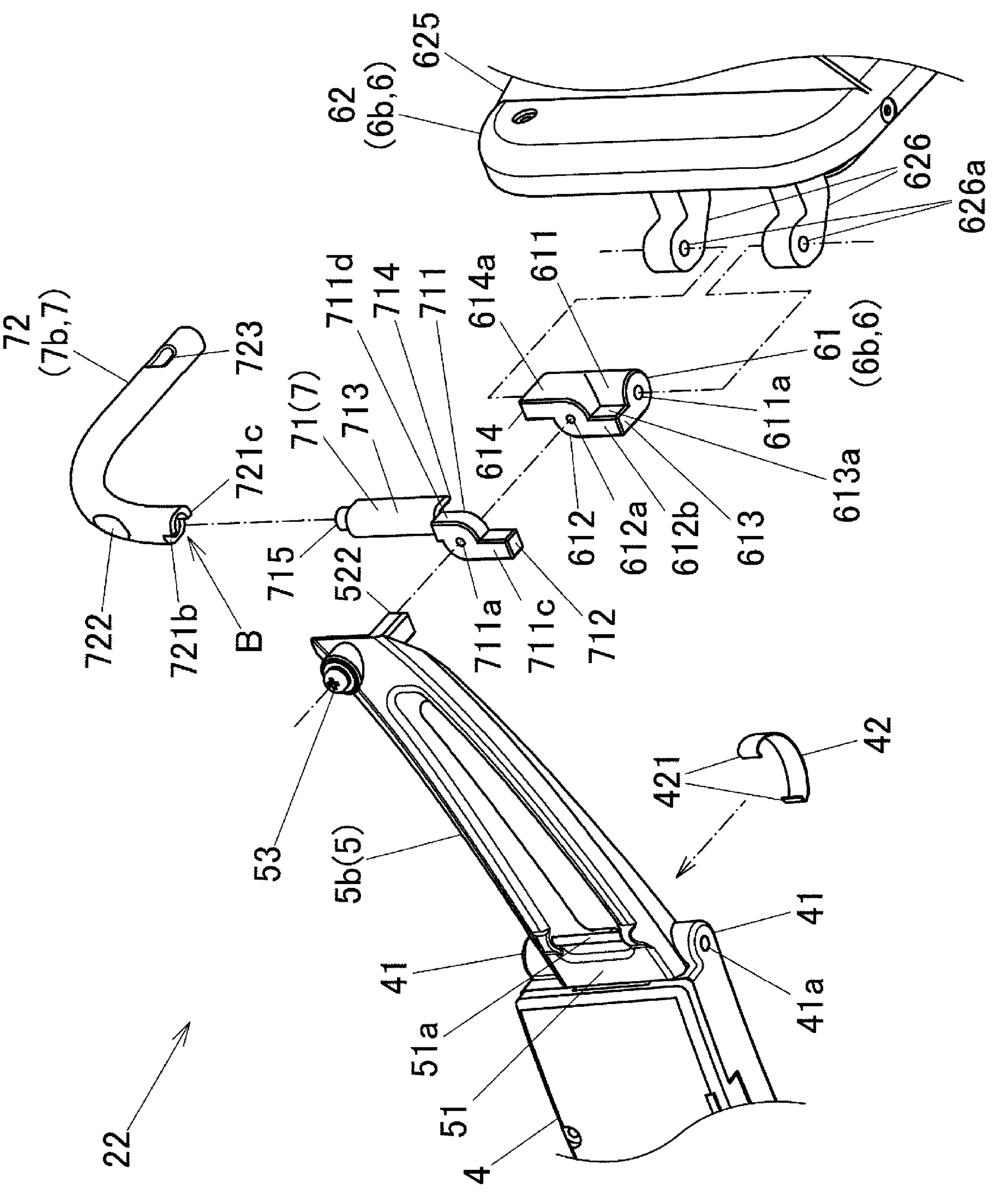
FIG. 5A is an exploded perspective view of the right arm portion of the speaker device according to the embodiment of the present invention as viewed from a lower rear side.
Figure 5B:
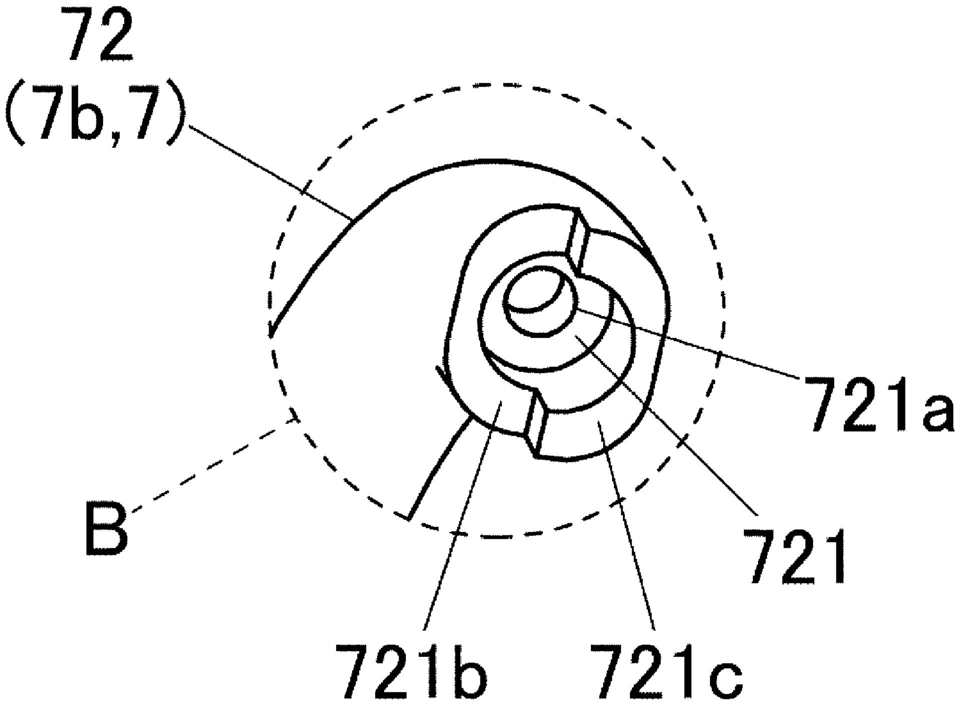
FIG. 5B is an enlarged view of a portion B shown in FIG. 5A.

Further, as shown in FIG. 5B, the tip end side member 72 is provided in a cylindrical shape in which a connection side to the base portion side rotary member 71 is curved in an arc shape at approximately 90 degrees. A circular concave portion 721 is provided inside one end side of the tip end side member 72. A screw hole 721*a*, through which a screw member (not shown) is insertable, is opened in the concave portion 721. In addition, around an outer peripheral edge of the concave portion 721, the tip end side member 72 includes an outer peripheral portion 721*b* which is a flat surface having a semicircular arc shape, and a rotation restricted portion 721*c* which protrudes from the outer peripheral portion 721*b* in an axial direction of the screw hole 721*a*. The outer peripheral portion 721*b* and the rotation restricted portion 721*c* are provided in an angle range of 180 degrees around an axis of the screw hole 721*a*, respectively. Incidentally, as the tip end side member 72 is curved, the screw hole 721*a* penetrates a curved side surface of the tip end side member 72 on a convex side. A concave portion 722, on which a head of the screw member is disposable, is provided on an opposite side of the screw hole 721*a* from the concave portion 721 (also see FIG. 7). Accordingly, the tip end side member 72 and the base portion side rotary member 71 are rotatably connected within the predetermined angle range by fastening the screw member inserted from a concave portion 722 side to the female screw portion 715*a* via the screw hole 721*a*.

The tip end side member 72 has an opening portion 723 on a side opposite from a rotation restricted portion 721*c* side. A suspension member 8 (see FIG. 1 and the like) is coupled to the opening portion 723. The opening portion 723 is penetrated in a left-right direction in FIG. 4A and is formed to be long in an axial direction of the tip end side member 72. As shown in FIG. 1, since a mounting portion 70 connected to left and right positions of the frame 5 by the left support portion 7*a*, the right support portion 7*b*, and the suspension member 8 can be suspended from the head H1, the speaker device 2 (or the hood-type speaker device 1 including the hood 3) can be easily mounted on the head H1 by the mounting portion 70.

The suspension member 8 includes a hanging cord 81 which is a string-shaped body, lower adjusters 82, and upper adjusters 83. The hanging cord 81 is inserted into the opening portion 723. One end side of the hanging cord 81 and the left support portion 7*a* are connected above the left speaker 6*a*. Further, the other end side of the hanging cord 81 and the right support portion 7*b* are connected above the right speaker 6*b*. Accordingly, the hanging cord 81 is disposed between the left support portion 7*a* and the right support portion 7*b*. The lower adjuster 82 can be fixed to the hanging cord 81 at any position while the hanging cord 81 is inserted into the lower adjuster 82. The lower adjuster 82 is formed larger than the opening portion 723. Therefore, when the hanging cord 81 positioned between the left support portion 7*a* and the right support portion 7*b* is pulled (in the example of FIG. 1, when the speaker device 2 is hung from the head H1 by the hanging cord 81), as shown in FIG. 1, the lower adjuster 82 abuts against an opening edge portion of the opening portion 723, and a pull-out amount of the hanging cord 81 between the left support portion 7*a* and the right support portion 7*b* is restricted. Therefore, a length between the left support portion 7*a* and the right support portion 7*b* of the hanging cord 81 can be adjusted by a fixed position of the lower adjuster 82, and accordingly, a height (vertical position) of the speaker device 2 with respect to the head H1 can be easily set. The hanging cord 81 between the left support portion 7*a* and the right support portion 7*b* is divided into two. A front hanging cord 81 is suspended from a front side of the head H1, and a rear hanging cord 81 is suspended from a rear side of the head H1, whereby the speaker device 2 is supported so as not to slip down (see also FIG. 2). Two divided lengths of the hanging cord 81 can be adjusted by the upper adjusters 83.

Returning to FIG. 4A, the speaker 6 includes the base portion side rotary member 61 and a speaker main body 62. The base portion side rotary member 61 includes a tubular support portion 611 including a bearing 611*a* inside, and a tubular supported portion 612 provided with a female screw portion 612*a* (also see FIG. 5A) substantially perpendicular to the bearing 611*a* of the support portion 611. The supported portion 612 is connected to a substantially intermediate portion of the support portion 611 in an axial direction so as to extend laterally. The base portion side rotary member 61 includes a rectangular thick plate-shaped restricted portion 613 and a restricting portion 614. The restricted portion 613 is disposed on one side of the bearing 611*a* so as to connect curved side surfaces of the supporting portion 611 and the supported portion 612. Further, the restricting portion 614 is disposed on the other side of the bearing 611*a* so as to connect the curved side surfaces of the supporting portion 611 and the supported portion 612. The restricting portion 614 and the restricted portion 613 extend in substantially opposite directions from respective sides of the bearing 611*a*.

The supported portion 612 has a flat sliding contact surface 612*b* on a rear surface side with an axis of the female screw portion 612*a* directed to a rear side in FIG. 5A. The sliding contact surface 612*b* is provided on a single surface connecting the restricted portion 613 and the restricting portion 614 facing each other. The restricted portion 613 is provided with an abutting surface 613*a* that is abuttable against the restricting protrusion 522 of the frame 5 to restrict rotation of the base portion side rotary member 61. Further, the restricting portion 614 is provided with an abutting surface 614*a* which is abuttable against the abutting surface 714*a* of the base portion side rotary member 71 to restrict relative rotation of the base portion side rotary member 71 and the base portion side rotary member 61. The abutting surface 613*a* and the abutting surface 614*a* are disposed on an outer surface (right side in the case of the right speaker 6*b*) of the speaker device 2 in the state of FIG.

5A in which the restricted portion 613 is positioned below the support portion 611. The base portion side rotary member 61 is axially symmetrical around the female screw portion 612*a*.

As shown in FIG. 4A, the entire speaker main body 62 is formed in a rectangular plate shape. On an inner side surface of the speaker main body 62, a sound emitting portion 621 including a plurality of holes for emitting sounds from sound emitting elements therein is provided. The sound emitting portion 621 is surrounded by a rectangular rib 622. On an outer side surface of the speaker main body 62, a sound emitting portion 623 having a plurality of holes for emitting sounds from sound emitting elements is also provided (see the left speaker 6*a* in FIG. 3). Ribs 624 are provided on front and rear outer peripheral portions of the sound emitting portion 623 in the upper-lower direction. The sound emitting portion 621 and the sound emitting portion 623 are provided in a rectangular region. A cushion member may be disposed around an outer periphery of the rib 622, or the like.

A cutout portion 625 for avoiding interference with the support portion 7 is provided at an upper end portion of the speaker main body 62. On the speaker main body 62, the push buttons SW for operating the speaker device 2 can be disposed at a front edge and an upper edge (see FIGS. 1 and 2). As shown in FIG. 2, a connection portion (jack J) to which a communication cable or the like can be connected is disposed on an outer side surface of the speaker main body 62 of the left speaker 6*a*. The left speaker 6*a*, the right speaker 6*b*, and an internal circuit of the main body portion 4 are connected to one another by interconnects (not shown).

Returning to FIG. 4A, hinge portions 626 are provided to protrude from an inner surface of an end portion of the speaker main body 62 on a frame 5 side (rear side). The hinge portions 626 are provided at two positions such that bearings 626*a* formed in the upper-lower direction in FIG. 4A are disposed at same axial positions.

Next, a configuration of a connection state of the members will be described. As shown in a VI-VI cross-sectional view of FIG. 6, the screw member 53 inserted through the opening portion 711*a* of the base portion side rotary member 71 of the support portion 7 constituting the mounting portion 70 and the opening portion 521 of the frame 5 is fastened to the female screw portion 612*a* of the base portion side rotary member 61 of the speaker 6. Therefore, the speakers 6 (left speaker 6*a* and right speaker 6*b*) are connected to the frame 5 so as to be rotatable around the first axis P1. The support portions 7 (left support portion 7*a* and right support portion 7*b*) are connected to the frame 5 so as to be rotatable around the third axis P3 that is positioned to be parallel to and coaxial with the first axis P1.

Figure 6:
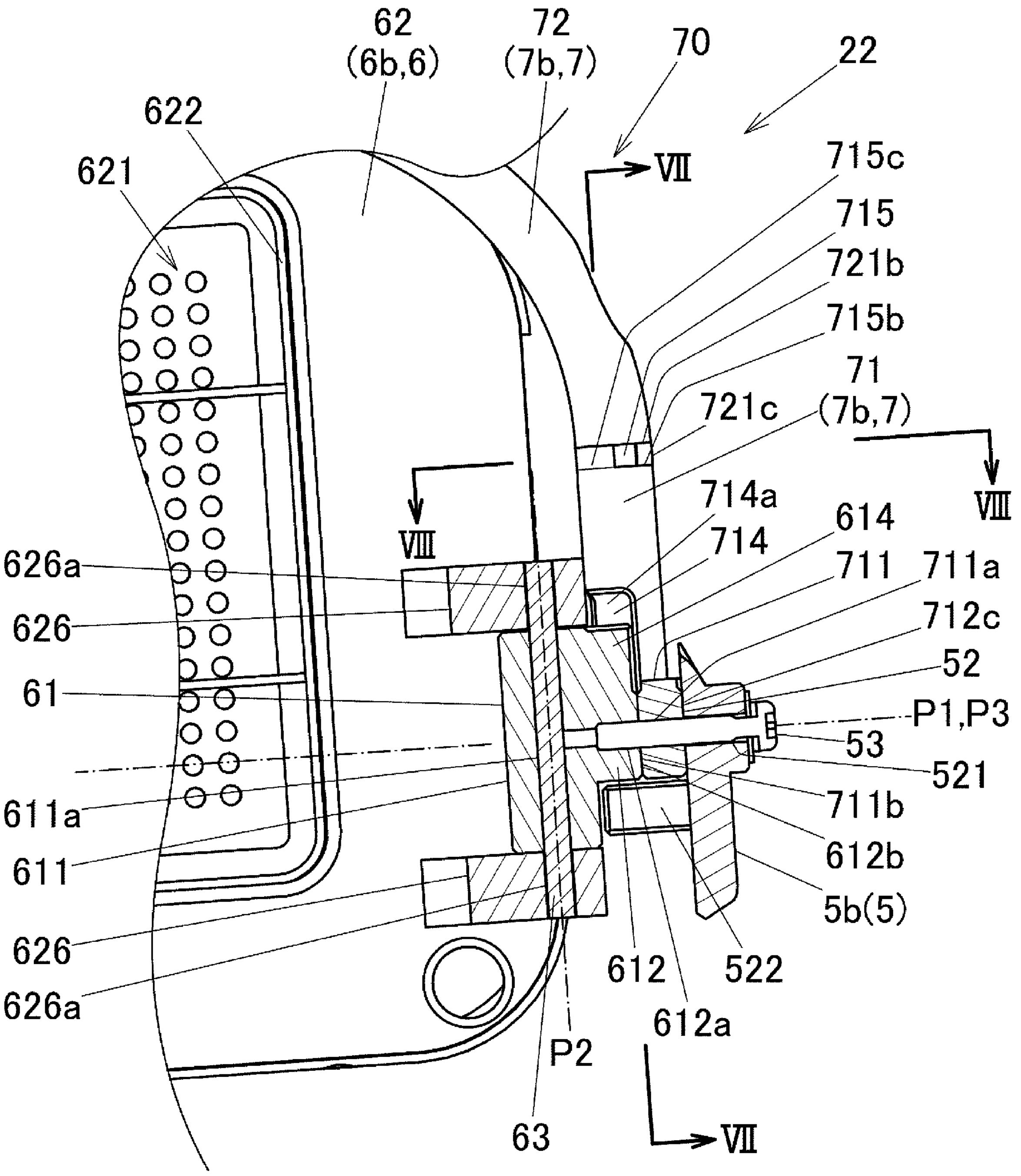
FIG. 6 is a cross-sectional view of the speaker device according to the embodiment of the present invention taken along a line VI-VI shown in FIG. 3.

Further, in the connection state of FIG. 6, when the screw member 53 is fastened, the sliding contact surface 612*b* and the sliding contact surface 711*b* abut against with each other, the sliding contact surface 711*c* and the sliding contact surface 52 abut against with each other, and the base portion side rotary member 71 is sandwiched and pressed in an axial (first axis P1 and third axis P3) direction by the base portion side rotary member 61 and the frame 5. Accordingly, the speakers 6 (left speaker 6*a* and right speaker 6*b*) and the support portions 7 (left support portion 7*a* and right support portion 7*b*) are connected to the frame 5 so as to be independently adjustable in angle around the first axis P1 or the third axis P3 (that is, so as to be stationary at any angle).

A shaft core member 63 is disposed on the bearing 611*a* of the base portion side rotary member 61 of the speaker 6 and the bearing 626*a* of the speaker main body 62. Accordingly, the speaker main body 62 is connected to the base portion side rotary member 61 so as to be rotatable around the second axis P2. In the connection state of FIG. 6, the base portion side rotary member 61 is disposed such that upper and lower surfaces of the support portion 611 and the hinge portions 626 are in sliding contact with each other. Accordingly, the speakers 6 (left speaker 6*a* and right speaker 6*b*) are connected to the frame 5 via the base portion side rotary member 61 so as to be adjustable in angle around the second axis P2 (that is, so as to be stationary at any angle).

Figure 7:
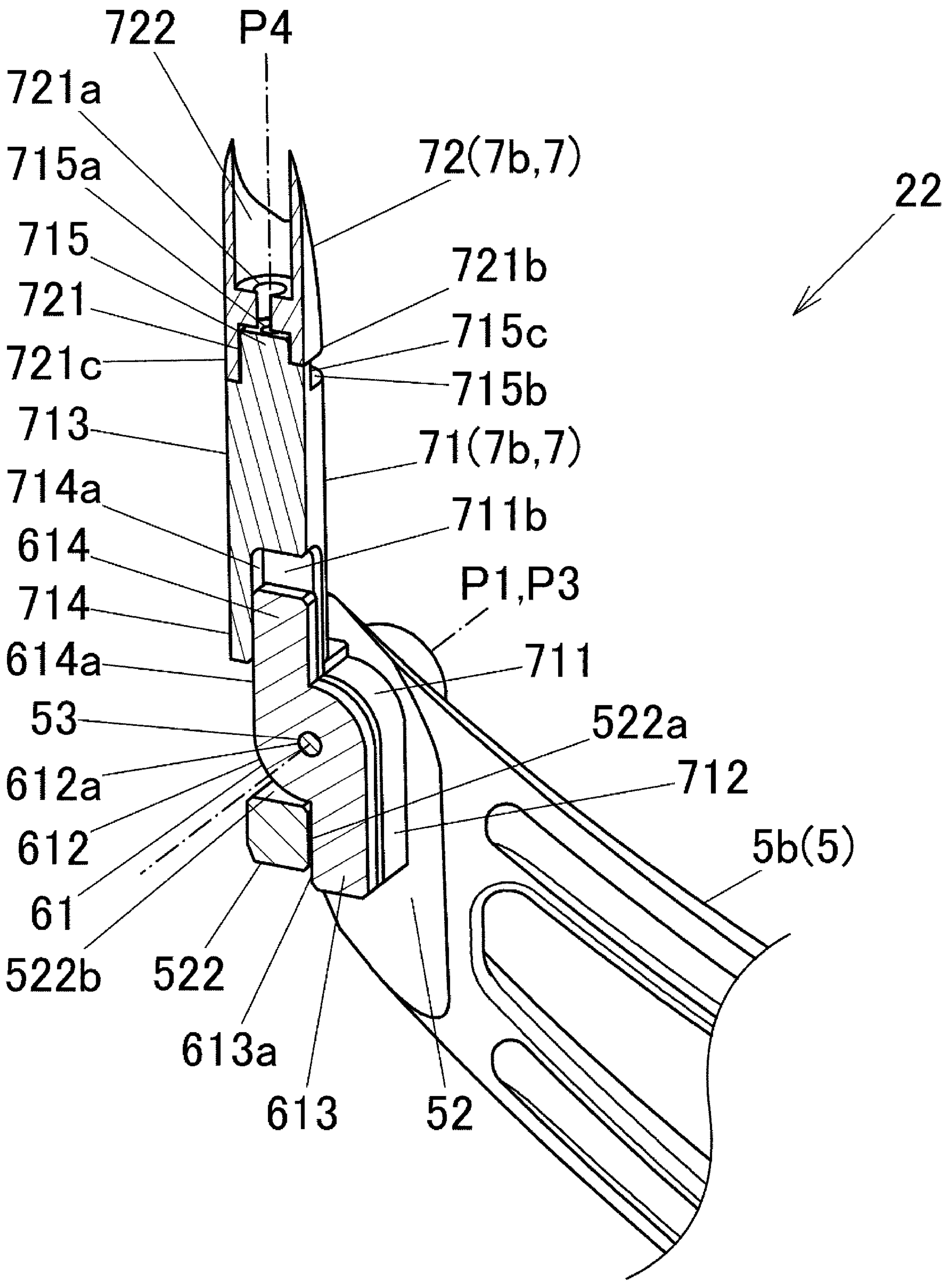
FIG. 7 is a cross-sectional view of the speaker device according to the embodiment of the present invention taken along a line VII-VII shown in FIG. 6.

As shown in FIG. 7, since the restricted portion 613 (abutting surface 613*a*) abuts against an inner surface 522*a* of the restricting protrusion 522, the rotation of the base portion side rotary member 61 toward the inside of the speaker device 2 (clockwise direction side around the axes P1 and P3 viewed from a front side in FIG. 7 in the right arm portion 22) is restricted. Further, since the restricting portion 614 abuts against an upper surface 522*b* of the restricting protrusion 522, the rotation of the base portion side rotary member 61 toward the outside of the speaker device 2 (counterclockwise direction side around the axes P1 and P3 viewed from the front side in FIG. 7 in the right arm portion 22) is restricted.

Since the base portion side rotary member 61 and the speaker main body 62 are fixed to each other around the first axis P1 (or third axis P3), the entire speaker 6 is rotatable around the first axis P1 (or third axis P3) within a predetermined angle range with respect to the frame 5.

The first axis P1 is the roll axis extending substantially in the front-rear direction, and the second axis P2 is the yaw axis extending substantially in the upper-lower direction orthogonal to the first axis P1.

On the other hand, since the restricted portion 712 abuts against the inner surface 522*a* of the restricting protrusion 522, the rotation of the base portion side rotary member 71 toward the inside of the speaker device 2 (clockwise direction side around the axes P1 and P3 viewed from the front side in FIG. 7 in the right arm portion 22) is also restricted. Since the abutting surface 711 of the restricted portion 712 abuts against the upper surface 522*b* of the restricting protrusion 522, the rotation of the base portion side rotary member 71 toward the outside of the speaker device 2 (counterclockwise direction side around the axes P1 and P3 viewed from the front side in FIG. 7 in the right arm portion 22) is restricted. Since the base portion side rotary member 71 and the tip end side member 72 are in sliding contact with a screw member (not shown) fastened to the female screw portions 751*a* with a more appropriate load, the base portion side rotary member 71 and the tip end side member 72 are connected to each other so as to be adjustable in angle (that is, so as to be stationary at any angle).

The base portion side rotary member 71 and the tip end side member 72 are fixed to each other around the third axis P3 (or first axis P1), so that the entire support portion 7 is rotatable around the third axis P3 (or first axis P1) within a predetermined angle range with respect to the frame 5.

When the abutting surface 614*a* of the restricting portion 614 abuts against the abutting surface 714*a* of the restricting portion 714, the rotation of the base portion side rotary member 61 and the base portion side rotary member 71 in a counterclockwise direction around the axes P1 and P3 of the base portion side rotary member 61 is restricted (in other words, the rotation in the clockwise direction around the axes P1 and P3 of the base portion side rotary member 71 is restricted) as viewed from the front side in FIG. 7. Accordingly, as shown in the front view of FIG. 1, the rotation of the support portions 7 (left support portion 7*a* and right support portion 7*b*) is restricted so as not to be closer to left and right ears H2 side as compared with the speakers 6 (left speaker 6*a* and right speaker 6*b*). Accordingly, the left speaker 6*a* and the right speaker 6*b* can be connected to the frame 5 and held at a predetermined distance from each other, and can be maintained in a state of having any distance from the ears H2 (or the head H1).

Figure 8:
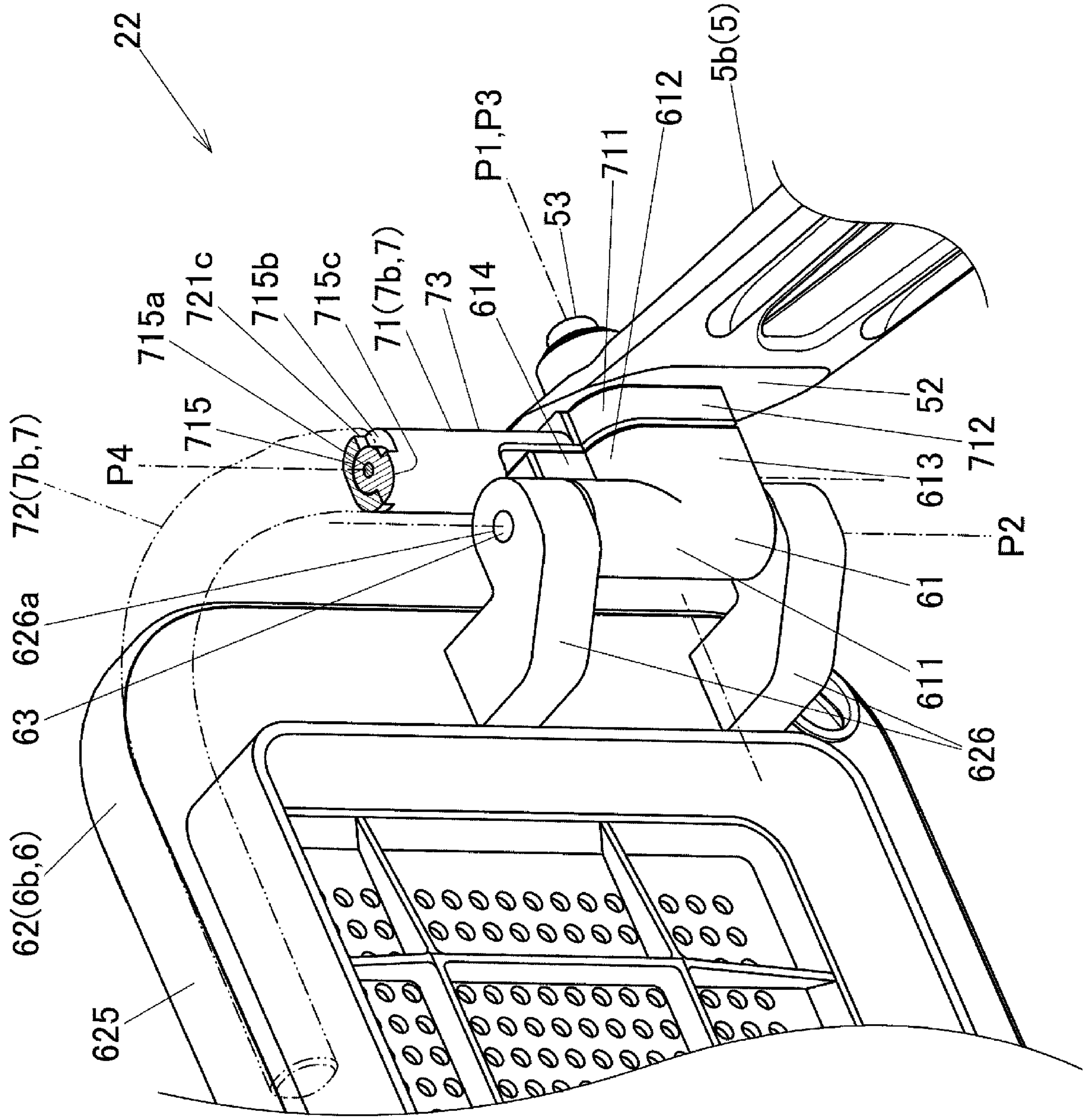
FIG. 8 is a cross-sectional view of a support portion of the speaker device according to the embodiment of the present invention taken along a line VIII-VIII shown in FIG. 6.

As shown in FIG. 8, the tip end side member 72 is connected to the base portion side rotary member 71 so as to be rotatable around the fourth axis P4 within a predetermined angle range. When the base portion side rotary member 71 and the tip end side member 72 are connected to each other, the rotation restricted portion 721*c*, which is a protrusion on a tip end side member 72 side, is disposed on the outer peripheral portion 715*b* on a base portion side rotary member 71 side. The rotation restricting portion 715*c*, which is a protrusion on the base portion side rotary member 71 side, is disposed on the outer peripheral portion 721*b* on the tip end side member 72 side (see FIG. 5B). As described above, the rotation restricting portion 715*c* is provided in the angle range of 90 degrees, and the rotation restricted portion 721*c* is provided in the angle range of 180 degrees. Accordingly, the tip end side member 72 is rotatably provided in the angle range of 90 degrees with a side surface of the rotation restricted portion 721*c* in the direction around the fourth axis P4 and a side surface of the rotation restricting portion 715*c* around the fourth axis P4 abutting against each other.

The tip end side member 72 in FIG. 8 is positioned at a rotary end in the counterclockwise direction viewed from above the fourth axis P4 with the rotation restricted portion 721*c* and the rotation restricting portion 715*c* abutting against each other. The fourth axis P4 is disposed parallel to the second axis P2 in a state in which the restricted portions 613 and 712 shown in FIGS. 7, 8 and the like abut against the restricting protrusion 522. Accordingly, the third axis P3 is the roll axis extending substantially in the front-rear direction, and the fourth axis P4 is the yaw axis extending substantially in the upper-lower direction orthogonal to the third axis P3.

In this manner, the speakers 6 and the support portions 7 are connected to the frame 5 so as to be independently rotatable while being restricted within the predetermined angle ranges. The speaker 6 and the support portion 7 are also connected to each other so as to be independently rotatable while being restricted within the predetermined angle ranges. The left speaker 6*a* and the right speaker 6*b* are respectively connected to the frames 5 so as to be rotatable around the first axis P1 and the second axis P2, and the left support portion 7*a* and the right support portion 7*b* are respectively connected to the frames 5 so as to be rotatable around the third axis P3 and the fourth axis P4.

As shown in FIG. 1, when the speaker device 2 is mounted such that the hanging cord 81 is placed on the head H1, the support portion 7 is pulled toward a head H1 side by the hanging cord 81. However, the rotation of the support portion 7 around the third axis P3 (or the first axis P1) is restricted by the restricted portion 712 abutting against the restricting protrusion 522 or the restricting portion 714 abutting against the restricting portion 614, and the rotation of the support portion 7 around the fourth axis P4 is restricted by the rotation restricted portion 721*c* abutting against the rotation restricting portion 715*c*. Even when the support portion 7 is at an angular position around the first axis P1 (or the third axis P3), the support portion 7 is prevented from moving to the inside (head H1 side) of the speaker 6. Accordingly, it is possible to prevent the tip end side member 72 or the like of the support portion 7 from coming into contact with the head H1 or the ears H2.

Next, a hinge structure of the main body portion 4 and the frame 5 will be described. As shown in FIG. 9A, as described above, the engaging portions 421 of the elastic member 42 engage with the engaged portion 41*b* and the engaged portion 51*a*. The elastic member 42 is disposed in a pulled state against an elastic force. As shown on a left frame 5*a* side in FIG. 9A, when the frame 5 performs an opening and closing operation, the engaged portion 51*a* moves around the shaft core member 41*a* as shown by a one-dot chain line. When the frame 5 is in the open state, the engaged portion 51*a* is positioned at a position Q1, and when the frame 5 is in the close state, the engaged portion 51*a* is positioned at a position Q3. A position Q2 is a position of the engaged portion 51*a* in a middle of transition between the open state and the close state of the frame 5, and indicates a state in which the engaged portion 41*b* and the engaged portion 51*a* are linearly disposed with the shaft core member 41*a* interposed therebetween. When the engaged portion 51*a* is positioned at the position Q2, a distance between the engaged portion 41*b* and the engaged portion 51*a* is longer as compared with a case in which the engaged portion 51*a* is positioned at the positions Q1 or Q3, and the elastic force of the elastic member 42 is larger as the elastic member 42 is further pulled. Accordingly, since the frame 5 is biased in a direction of the open state in which the engaged portion 51*a* is positioned at the position Q1 or the close state in which the engaged portion 51*a* is positioned at the position Q3 with the position Q2 as a boundary, a posture of the speaker device 2 can be stably maintained in the open state (see FIGS. 3 and 9A) or the close state (see FIGS. 10 and 9B).

Figure 10:
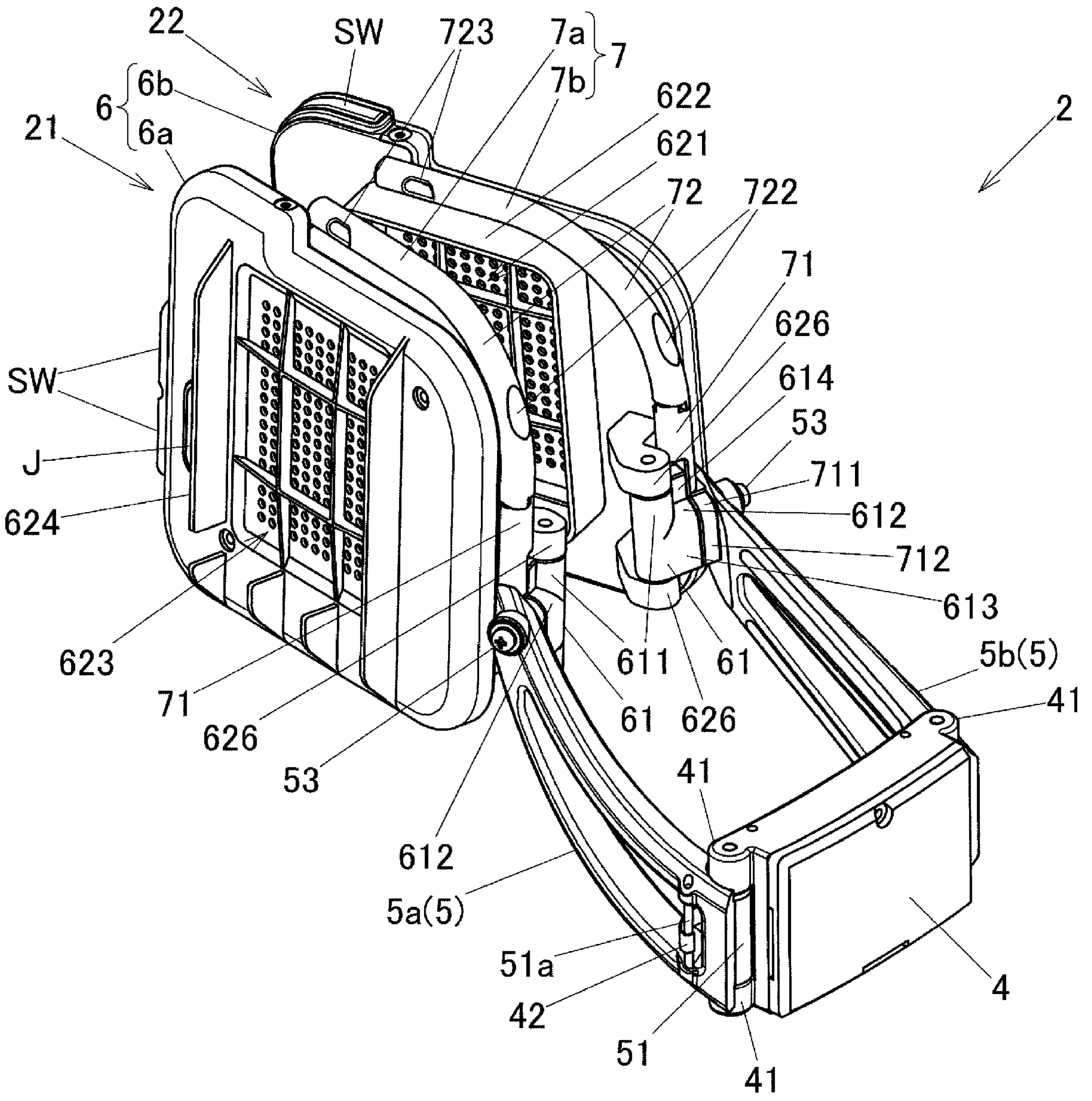
FIG. 10 is a perspective view of the speaker device according to the embodiment of the present invention in the state in which the left arm portion and the right arm portion are closed.

As shown in FIG. 10, in the speaker device 2, when the frame 5 (or left arm portion 21 and right arm portion 22) is in the close state, the speakers 6 and the support portions 7 are rotated around the second axis P2 or the fourth axis P4 in an outward direction, so that a tip end portion of the speaker 6 can be directed to the front side and the speaker device 2 can be folded in a compact manner.

The left speaker 6*a* and the right speaker 6*b* are connected to the frame 5 so as to be rotatable between a first state (see FIG. 1) in which sound emission directions are opposed to each other and a second state (see FIG. 11) in which the sound emission directions are directed upward (including an upward oblique direction). In the first state of FIG. 1, the hood 3 is placed over the head H1, and the left speaker 6*a* and the right speaker 6*b* are placed so as to sandwich the head H1 therebetween, so that the user can listen to sounds in a space defined by the hood 3. In the speaker device 2, the speaker 6 and the support portion 7 can be disposed in a state of being separated substantially parallel to a side surface of the head H1 on the ear H2 side. Since an angle of the speaker 6 can be adjusted independently of the support portion 7, the angle can be freely adjusted according to user's preference regardless of the position of the mounting portion 70. Therefore, the user can easily enjoy a personal acoustic space with stable acoustic characteristics with no feeling of oppression.

Figure 11:
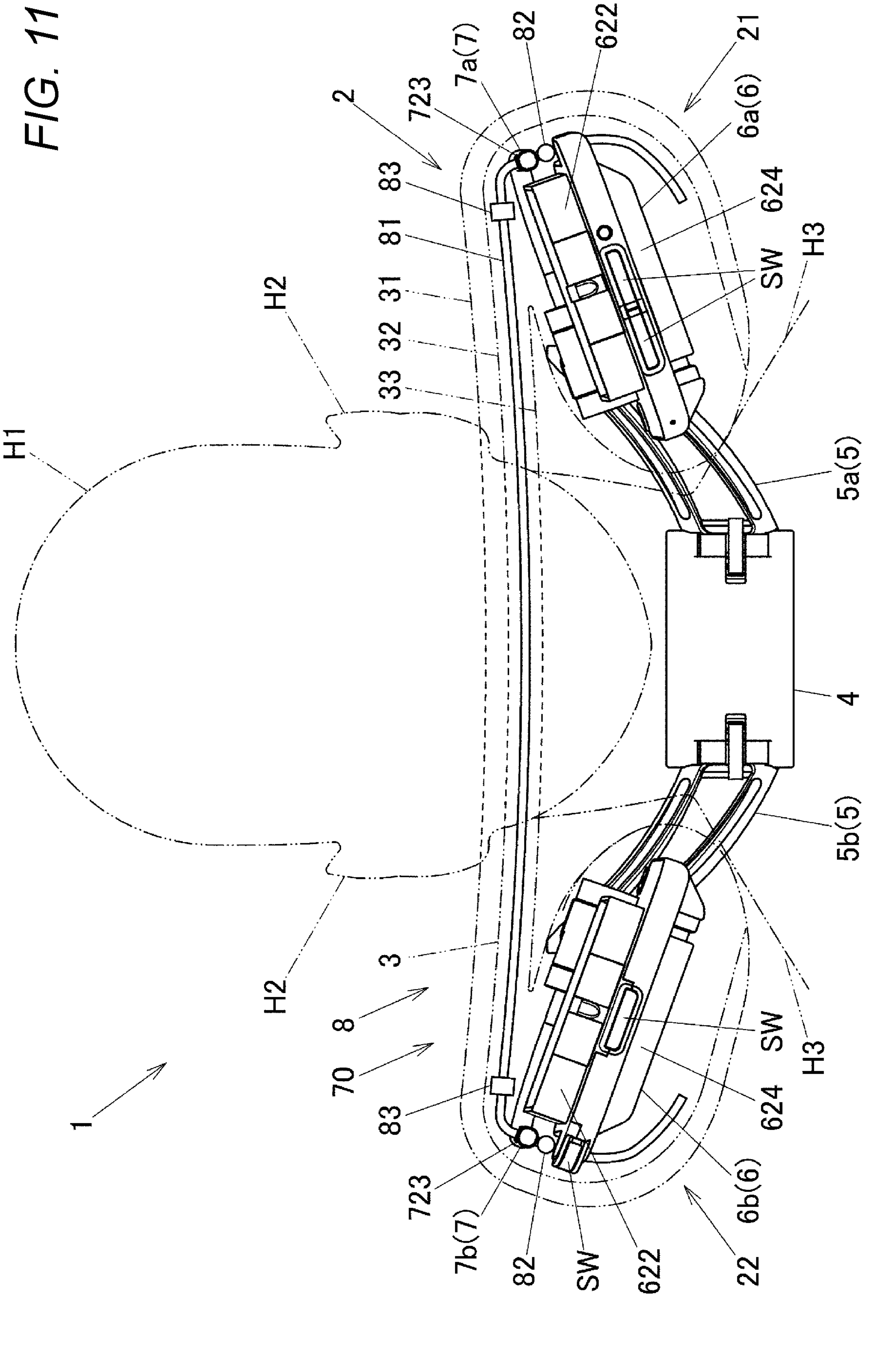
FIG. 11 is a front view showing a state in which a hood of the hood-type speaker device according to the embodiment of the present invention is lowered.

In the second state of FIG. 11, the hood 3 is lowered from the head H1, and the hood-type speaker device 1 is placed around a shoulder H3 and a collar. Accordingly, even when the user lowers the hood 3 and places the speaker device 2 on the shoulder H3, the user can listen to the sound emitted from the speaker 6 in a state in which the hood-type speaker device 1 is worn. Also in this case, the user can freely adjust the angle of the speaker 6 toward the ears H2. Even in the second state, since the speaker device 2 can be stably positioned at the shoulder H3, the position between the speaker 6 and the ears H2 can be stably maintained. Further, even when the user moves the shoulder H3 or the like, the position between the speaker 6 and the ears H2 can be relatively stably maintained.

(First Modification)

Next, a first modification according to the present embodiment will be described. A speaker device 2A built in the hood 3 of a hood-type speaker device 1A of FIG. 12 includes the speakers 6 (left speaker 6*a* and right speaker 6*b*) and a mounting portion 70A. The mounting portion 70A includes the hanging cord 81 that is the suspension member.

The speaker device 2A includes a frame 5A, which is bent in an L shape with an obtuse angle and is formed of a rod-shaped member or a plate-shaped member. The frame 5A is fixed to the speakers 6 (left speaker 6*a* and right speaker 6*b*) via the support portion 7 from an one end portion 5A1. The hanging cord 81 is connected to the other one end portion 5A2 of the frame 5A. The hanging cord 81 may further include an adjuster configured to adjust a length of the hanging cord 81, so that a height position of the speaker 6 can be adjusted. Further, the frame 5A may include a control circuit, a battery, and the like, and may have a function of the main body portion 4 in the speaker device 2.

Figure 12:
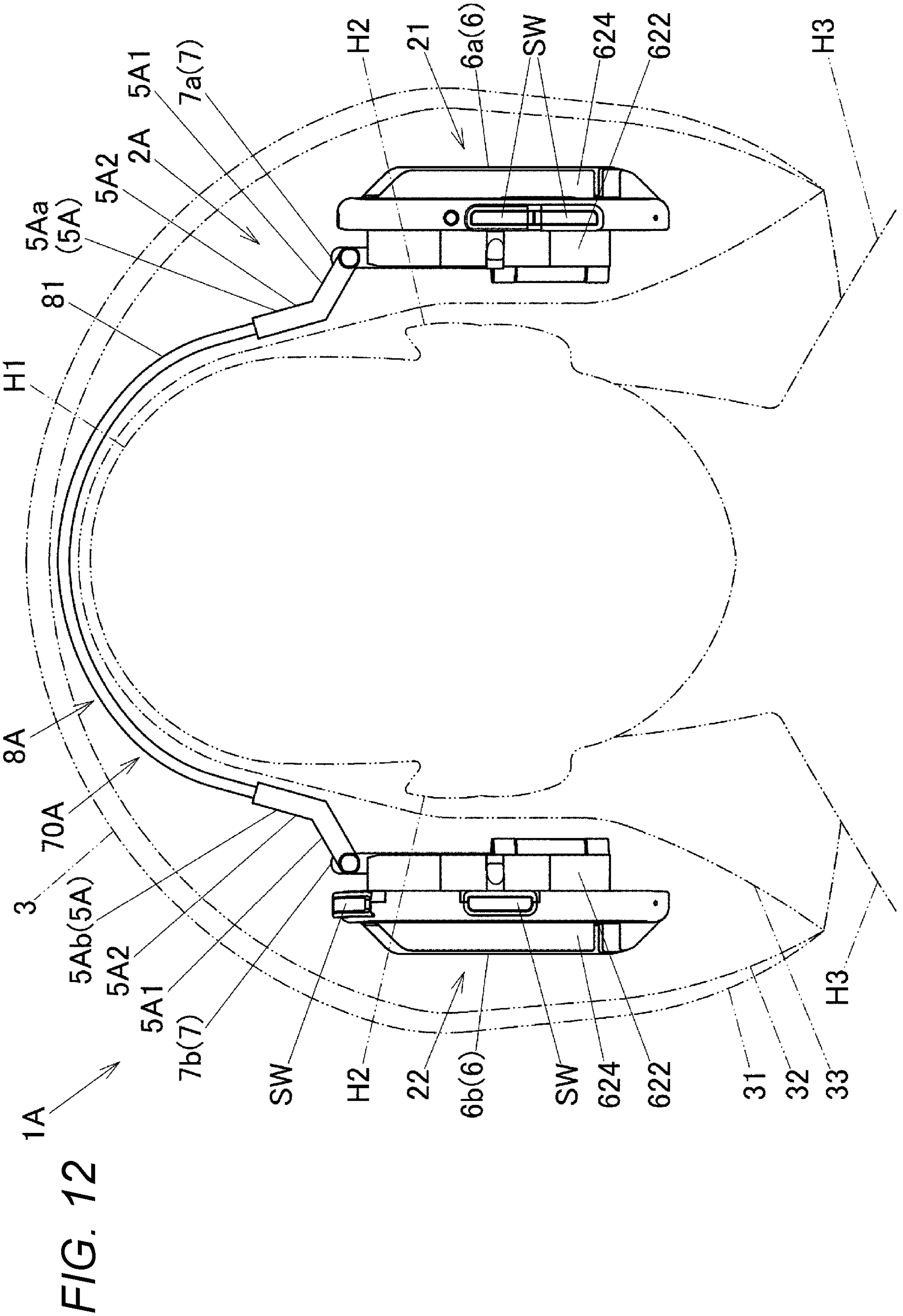
FIG. 12 is a diagram showing a hood-type speaker device according to a first modification of the embodiment of the present invention.

Even when the hood-type speaker device 1A is used by covering the head H1 with the hood 3 as shown in FIG. 12, the support portion 7 is pulled toward the head H1 side by the hanging cord 81. However, since an one end portion 5A2 side of the frame 5A can abut along a temporal region of the head H1, the left speaker 6*a* and the right speaker 6*b* connected to the frame 5A can be held at a predetermined interval, and thus a distance from the left and right ears H2 (or the head H1) can be more stably maintained. Further, even when the user moves the head H1 or the like, the speaker device 2A follows a position of the head H1 since the speaker device 2A is suspended by the mounting portion 70A, and the position of the speaker 6 with respect to the ears H2 can be stably maintained. Accordingly, also in the first modification, it is possible to configure the speaker device 2A and the hood-type speaker device 1A which can prevent the speaker 6 from coming into contact with the head H1 and the ears H2 and can stably support the speaker 6 with no feeling of oppression.

(Second Modification)

Figure 13:
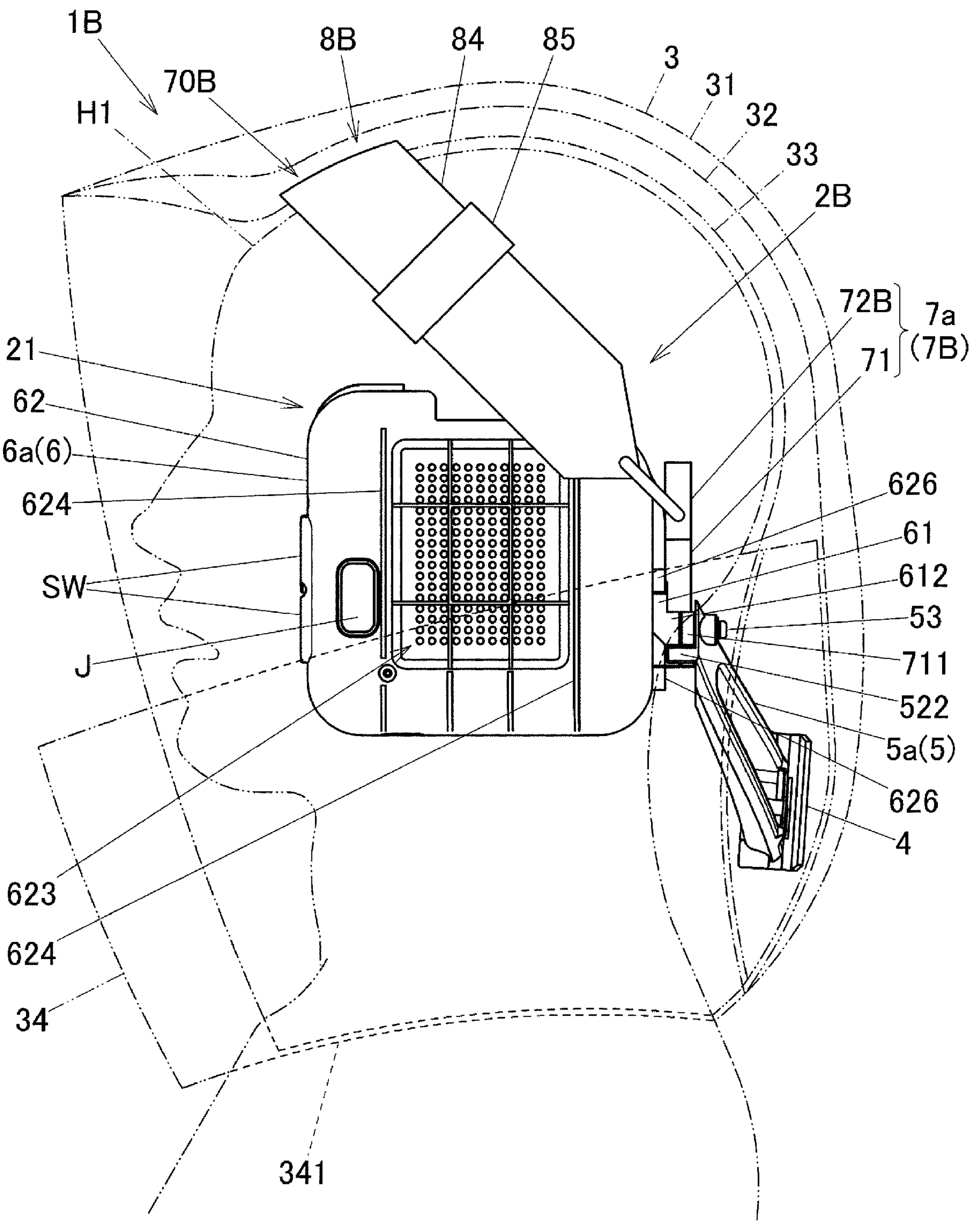
FIG. 13 is a diagram showing a hood-type speaker device according to a second modification of the embodiment of the present invention.

Next, a second modification according to the present embodiment will be described. The speaker device 2B built in the hood 3 of the hood-type speaker device 1B of FIG. 13 includes the main body portion 4, the frame 5 (left frame 5*a* and right frame 5*b*), the speaker 6 (left speaker 6*a* and right speaker 6*b*), and a mounting portion 70B. The mounting portion 70B includes a support portion 7B (which is shown in FIG. 13 for the left arm portion 21, but the same applies to the right arm portion) formed by the base portion side rotary member 71 and a tip end side member 72B instead of the support portion 7 in the speaker device 2. The tip end side member 72B includes the concave portion 721, the screw hole 721*a*, then outer peripheral portion 721*b*, and the rotation restricted portion 721*c* (see FIG. 5B) at an end portion on the base portion side rotary member 71 side, and is rotatably connected to the base portion side rotary member 71 in the same angle range as the support portion 7.

The mounting portion 70B includes a suspension member 8B instead of the suspension member 8. The suspension member 8B includes a flat band-shaped belt 84 (string-shaped body) and a buckle 85 that can adjust a length of the belt 84. Both left and right end portions of the belt 84 are rotatably connected to the tip end side member 72B. The belt 84 is drawn out to the head H1 side via the outside of the speaker 6. Accordingly, bias of the belt 84 to a temporal region side of the head is restricted by the speaker 6. The rotation of the speaker 6 toward the inside (head H1 side) is restricted by the same configuration as the speaker device 2. Accordingly, the belt 84 and the speaker 6 are prevented from coming into contact with the head H1.

Further, the hood-type speaker device 1B includes a collar member 34 wound around left and right side surfaces and a rear head side of the head H1. The collar member 34 is formed, for example, on a part of the middle lining fabric 32 and the lining fabric 33, and has a U-shaped double structure in which the front side is opened in a plan view. The collar member 34 is formed to be less likely to deform (harder) as compared with an upper region (head H1 side) of the hood 3. Further, lower edge portions 341 that are concave curved are provided on left and right side portions of the collar member 34. A rear portion (for example, the frame 5 and the main body portion 4) of the speaker device 2B is disposed inside the collar member 34.

When the speaker device 2B is disposed such that the belt 84 is hung from the head H1, a position of the center of gravity is positioned behind an abutting position between the belt 84 and the head H1. Accordingly, a load is applied such that the rear portion of the speaker device 2B (the frame 5 and the main body portion 4 in the above-described example) rotates in a front direction. However, in the hood-type speaker device 1B, since the lower edge portion 341 of the collar member 34 is mounted so as to abut against the shoulder H3, a posture of the built-in speaker device 2B is supported, and the rear portion of the speaker device 2B can be prevented from abutting against the head H1 or the neck.

Accordingly, also in the second modification, the frame 5 can connect the left speaker 6*a* and the right speaker 6*b*, so that the left speaker 6*a* and the right speaker 6*b* can be held at a predetermined interval. Thus, it becomes possible to configure the speaker device 2B and the hood-type speaker device 1B that can be stably supported with no feeling of oppression.

Although the configurations of the hood-type speaker devices 1, 1A, and 1B according to the present embodiment have been described above, other configurations may be applied to the hood-type speaker devices 1, 1A, and 1B. For example, although the example in which the first axis P1 and the third axis P3 are coaxially disposed has been described in the present embodiment, the first axis P1 and the third axis P3 may be disposed at other positions which are relatively parallel to each other and are not coaxial with each other.

Although the speaker devices 2 and 2B have been described as including the main body portion 4 between the left frame 5*a* and the right frame 5*b*, the control circuit and the battery in the main body portion 4 may be provided in the left frame 5*a* or the right frame 5*b*, or in the left speaker 6*a* or the right speaker 6*b* to omit a housing of the main body portion 4. In this case, the speaker devices 2 and 2B may be connected such that the left frame 5*a* and the right frame 5*b* are relatively rotatable.

In the present embodiment, the hood 3 has the three-layer structure including the front fabric 31, the middle lining fabric 32, and the lining fabric 33, but the number of layers is not limited thereto, and two layers or four or more layers may be provided.

Further, in FIG. 6, a method of connecting the frame 5, the base portion side rotary member 61, and the base portion side rotary member 71 is not limited to the method of fastening the screw member 53 to the female screw portion 612*a* of the base portion side rotary member 61. As long as the base portion side rotary member 61 and the base portion side rotary member 71 are independently rotatable around the first axis P1 or the third axis P3 with respect to the frame 5, the frame 5, the base portion side rotary member 61 and the base portion side rotary member 71 may be connected by another connecting method.

The specific configurations of the speaker device 2, the speaker device 2A, and the speaker device 2B described in the present embodiment can be freely combined. For example, in any one of the speaker devices 2, 2A, and 2B, the belt 84 and the hanging cord 81 can be freely selected.

As described above, in the embodiment, the speaker devices 2, 2A, 2B each including the frame 5, the left speaker 6*a* and the right speaker 6*b* connected to the frame 5 and capable of holding each other at a predetermined interval, and the mounting portion 70 connected to the left and right positions of the frame 5 and capable of suspending from the head H1 have been described.

Accordingly, it is possible to prevent the position of the speaker 6 from being unintentionally displaced by its own weight or the like, and to stably support the speaker devices 2, 2A, and 2B. In addition, even when the head H1 is moved to the left and right or the like, it is possible to easily cause the speaker 6 and the ears H2 to follow each other such that the relative positions thereof are substantially constant. Thus, it becomes possible to configure the speaker device 2 that can be stably supported with no feeling of oppression. Further, since the speaker device 2 can be stably supported by the head H1, a function requiring precise control such as active noise control (ANC) can be mounted.

Further, in the speaker device 2, 2A, or 2B in which the mounting portion 70 includes the left support portion 7*a*, the right support portion 7*b*, and the string-shaped body, the mounting portion 70 can be formed in a lightweight and simple manner.

In addition, the configuration in which the left support portion 7*a* is formed in an L-shape extending from the rear side to the upper side of the left speaker 6*a* and is connected to one end side of the string-shaped body above the left speaker 6*a*, and the right support portion 7*b* is formed in an L-shape extending from the rear side to the upper side of the right speaker 6*b* and is connected to the other end side of the string-shaped body above the right speaker 6*b* has been described. Accordingly, while the support portion 7 is connected to the rear frame 5, the connection position between the string-shaped body and the support portion 7 can be provided in the front side where the speaker devices 2, 2A, and 2B can be stably supported.

In the speaker devices 2, 2A, and 2B in which the left speaker 6*a*, the right speaker 6*b*, the left support portion 7*a*, and the right support portion 7*b* are connected to the frame 5 so as to be independently adjustable in angle, a direction of the speaker 6 can be freely set according to the user's preference while avoiding the string-shaped body or the support portion 7 from coming into contact with the head H1.

Further, since the left support portion 7*a* is restricted from rotating toward a left ear H2 side with respect to the left speaker 6*a* and the right support portion 7*b* is restricted from rotating toward a right ear H2 side with respect to the right speaker 6*b*, it is possible to prevent a part of the support portion 7 or the string-shaped body from coming into contact with the head H1.

In addition, the configuration has been described in which the left speaker 6*a* and the right speaker 6*b* are respectively connected to the frames 5 so as to be rotatable around the first axis P1 and the second axis P2 different from the first axis P1, and the left support portion 7*a* and the right support portion 7*b* are respectively connected to the frames 5 so as to be rotatable around the third axis P3 and the fourth axis P4. Accordingly, since the left and right speakers 6 and the support portion 7 are rotatable in two axial directions, it is possible to from the speaker devices 2, 2A, or 2B capable of adjusting an angle with a high degree of freedom.

In addition, in the speaker device 2 in which the string-shaped body includes a plurality of hanging cords 81, the speaker device 2 can be stably supported so as not to slide down from the head H1 by suspending a part of the hanging cords 81 in front of the head H1 and suspending another part of the hanging cords 81 behind the head H1.

The configuration in which the left speaker 6*a* and the right speaker 6*b* are rotatably connected to the frame 5 between the first state in which the sound emission directions are opposed to each other and the second state in which the sound emission directions are directed upward has been described. Accordingly, the user can use the speaker devices 2 or 2B (2A) in any mode according to a scene, preference, or the like.

The configuration in which the frame 5 includes the left frame 5*a* connected to the left speaker 6*a* and the right frame 5*b* connected to the right speaker 6*b*, and the left frame 5*a* and the right frame 5*b* can be opened and closed via the hinge portion 41 has been described. As a result, the speaker devices 2 and 2B (2A) can be compactly housed.

The hood-type speaker devices 1, 1A, and 1B including the speaker devices 2, 2A, and 2B described above and the hood 3 built in the speaker devices 2, 2A, and 2B are formed to be suspended from the head H1 by the mounting portion 70, and thus even when a flexible material is used for the hood 3, the position of the speaker 6 can be prevented from being displaced by its own weight or the like. In addition, even when the head H1 is moved to the left or right, the head H1 can easily follow the movement. Thus, it becomes possible to configure the hood-type speaker device 1 that can be stably supported with no feeling of oppression.

The embodiments described above have been presented by examples and are not intended to limit the scope of the invention. These novel embodiments can be embodied in various other forms, and various omissions, replacements, and modifications can be made without departing from the scope and spirit of the invention. These embodiments and modifications thereof are included in the scope and outline of the invention, and are included in the scope of the invention described in the claims and equivalents thereof.

The present application is based on a Japanese Patent Application (JP2020-218123A) filed on Dec. 28, 2020, and contents thereof are incorporated herein by reference.

INDUSTRIAL APPLICABILITY

According to the present invention, it is possible to provide a speaker device and a hood-type speaker device that can be stably supported with no feeling of oppression.

REFERENCE SIGNS LIST

1, 1A, 1B Hood-type speaker device
2, 2A, 2B Speaker device
3 Hood
4 Main body portion
5, 5A Frame
5A1 One end portion

5A2 One end portion
5*a* Left frame
5*b* Right frame
5Aa Left frame
5Ab Right frame
6 Speaker
6*a* Left speaker
6*b* Right speaker
7, 7B Support portion
7*a* Left support portion
7*b* Right support portion
8, 8B Suspension member
21 Left arm portion
22 Right arm portion
31 Front fabric
32 Middle lining fabric
33 Lining fabric
34 Collar member
41 Hinge portion
41*a* Shaft core member
41*b* Engaged portion
42 Elastic member
51 Bearing portion
51*a* Engaged portion
52 Sliding contact surface
53 Screw member
61 Base portion side rotary member
62 Speaker main body
63 Shaft core member
70, 70A, 70B Mounting portion
71 Base portion side rotary member
72, 72B Tip end side member
81 Hanging cord
82 Lower adjuster
83 Upper adjuster
84 Belt
85 Buckle
341 Lower edge portion
421 Engaging portion
511 Groove portion
521 Opening portion
522 Restricting protrusion
522*a* Inner surface
522*b* Upper surface
611 Support portion
611*a* Bearing
612 Supported portion
612*a* Female screw portion
612*b* Sliding contact surface
613 Restricted portion
613*a* Abutting surface
614 Restricting portion
614*a* Abutting surface
621 Sound emitting portion
622 Rib
623 Sound emitting portion
624 Rib
625 Cutout portion
626 Hinge portion
626*a* Bearing
711 Supported portion
711*a* Opening portion
711*b* Sliding contact surface
711*c* Sliding contact surface
711*d* Abutting surface
712 Restricted portion
713 Extending portion
714 Restricting portion
714*a* Abutting surface
715 Shaft portion
715*a* Female screw portion
715*b* Outer peripheral portion
715*c* Rotation restricting portion
721 Concave portion
721*a* Screw hole
721*b* Outer peripheral portion
721*c* Rotation restricted portion
722 Concave portion
723 Opening portion
H1 Head
H2 Ear
H3 Shoulder
J Jack
P1 First axis
P2 Second axis
P3 Third axis
P4 Fourth axis
SW Push button

The invention claimed is:

1. A speaker device comprising:
a frame;
a left speaker and a right speaker that are coupled to the frame and are configured to be held at predetermined intervals; and
a mounting portion that is coupled to left and right positions of the frame and is configured to be suspended by a head,
wherein:
the mounting portion comprises a left support portion, a right support portion, and a string-shaped body coupled to the left support portion and the right support portion;
the left speaker and the right speaker are respectively coupled to the frame so as to be rotatable around a first axis and a second axis different from the first axis; and
the left support portion and the right support portion are coupled to the frame so as to be rotatable around a third axis parallel to the first axis and a fourth axis parallel to the second axis, respectively.

2. The speaker device according to claim 1,
wherein the left support portion is formed in an L-shape extending from a rear side to an upper side of the left speaker, the left support portion being coupled to one end side of the string-shaped body above the left speaker, and
wherein the right support portion is formed in the L-shape extending from the rear side to the upper side of the right speaker, the right support portion being coupled to other end side of the string-shaped body above the right speaker.

3. The speaker device according to claim 1,
wherein the left speaker, the right speaker, the left support portion, and the right support portion are coupled so as to be independently adjustable in angle with respect to the frame.

4. The speaker device according to claim 3,
wherein rotation of the left support portion is configured to be restricted so as not to approach a left ear side of the left speaker, and
wherein a rotation of the right support portion is configured to be restricted so as not to approach a right ear side of the right speaker.

5. The speaker device according to according to claim 1, wherein the string-shaped body comprises a plurality of hanging cords.

6. The speaker device according to according to claim 1, wherein the left speaker and the right speaker are coupled to the frame so as to be rotatable between a first state in which sound emission directions are opposed to each other and a second state in which the sound emission directions are directed upward.

7. The speaker device according to according to claim 1, wherein the frame comprises:
a left frame coupled to the left speaker; and
a right frame coupled to the right speaker, and
wherein the left frame and the right frame are openable and closable via a hinge portion.

8. A hood-type speaker device comprising:
the speaker device according to claim 1; and
a hood built in the speaker device.

9. A speaker device comprising:
a frame;
a left speaker and a right speaker that are coupled to the frame and are configured to be held at predetermined intervals; and
a mounting portion that is coupled to left and right positions of the frame and is configured to be suspended by a head, wherein
the mounting portion comprises a left support portion, a right support portion, and a string-shaped body coupled to the left support portion and the right support portion,
the left support portion is formed in an L-shape extending from a rear side to an upper side of the left speaker, the left support portion being coupled to one end side of the string-shaped body above the left speaker, and
the right support portion is formed in the L-shape extending from the rear side to the upper side of the right speaker, the right support portion being coupled to other end side of the string-shaped body above the right speaker.

10. The speaker device according to claim 9,
wherein the left speaker, the right speaker, the left support portion, and the right support portion are coupled so as to be independently adjustable in angle with respect to the frame.

11. The speaker device according to claim 10,
wherein rotation of the left support portion is configured to be restricted so as not to approach a left ear side of the left speaker, and
wherein a rotation of the right support portion is configured to be restricted so as not to approach a right ear side of the right speaker.

12. The speaker device according to according to claim 9, wherein the string-shaped body comprises a plurality of hanging cords.

13. The speaker device according to according to claim 9, wherein the left speaker and the right speaker are coupled to the frame so as to be rotatable between a first state in which sound emission directions are opposed to each other and a second state in which the sound emission directions are directed upward.

14. The speaker device according to according to claim 9, wherein the frame comprises:
a left frame coupled to the left speaker; and
a right frame coupled to the right speaker, and
wherein the left frame and the right frame are openable and closable via a hinge portion.

15. A hood-type speaker device comprising:
the speaker device according to claim 9; and
a hood built in the speaker device.

* * * * *